(12) United States Patent
Grottke et al.

(10) Patent No.: US 11,040,740 B2
(45) Date of Patent: Jun. 22, 2021

(54) SILL AND VEHICLE FRAME OF A VEHICLE BODY AND METHOD OF MANUFACTURING A SILL

(71) Applicant: Benteler Automobiltechnik GmbH, Paderborn (DE)

(72) Inventors: Stefan Grottke, Rheine (DE); Stefan Schmitz, Bielefeld (DE); Jochem Grewe, Salzkotten (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 81 days.

(21) Appl. No.: 16/671,328

(22) Filed: Nov. 1, 2019

(65) Prior Publication Data

US 2020/0140018 A1    May 7, 2020

(30) Foreign Application Priority Data

Nov. 2, 2018 (DE) .......................... 102018127368.1

(51) Int. Cl.
  *B60R 19/34* (2006.01)
  *B62D 25/02* (2006.01)
(52) U.S. Cl.
  CPC ................................. *B62D 25/025* (2013.01)
(58) Field of Classification Search
  CPC .. B62D 25/025; B62D 21/157; B62D 29/008; B62D 25/04; B62D 25/2036; B62D 25/20
  See application file for complete search history.

(56) References Cited

U.S. PATENT DOCUMENTS

| 6,354,656 B1 * | 3/2002 | Hwang | B62D 25/025 296/187.12 |
| 9,862,309 B2 * | 1/2018 | Oliverio | F21S 43/15 |
| 2011/0175399 A1 * | 7/2011 | Nakano | B62D 25/025 296/193.05 |
| 2013/0009424 A1 * | 1/2013 | Herntier | B62D 25/025 296/203.03 |
| 2013/0062912 A1 * | 3/2013 | Zornack | B62D 25/00 296/209 |
| 2013/0140854 A1 * | 6/2013 | Mori | B62D 25/025 296/209 |

(Continued)

FOREIGN PATENT DOCUMENTS

| DE | 19633911 A1 | 2/1998 |
| DE | 102009005760 A1 | 8/2009 |

*Primary Examiner* — Kiran B Patel

(57) ABSTRACT

The present invention relates to a sill of a vehicle body (3). The sill is characterized in that the sill (10) comprises at least a first sill profile (11) and a second sill profile (12), in that the sill profiles (11, 12) extend in the longitudinal direction of the sill (10) and each comprise a connecting surface (111, 121) which faces the further sill profile (11, 12),
in that the connecting surfaces (111, 121) at least partially run vertically, in that the at least two sill profiles (11, 12) over at least one area of the connecting surfaces (111, 121) of the sill profiles (11, 12) are adhesively connected to one another, and
in that at least on one of the sill profiles (11, 12), adjacent to the connecting surface (111, 121), at least one snap-in protrusion (14) is formed onto it which interlocks with at least one snap-in receiving section (15) of another one of the sill profiles (11, 12). Furthermore, the invention relates to a vehicle frame (1) with such a sill (10) and a method of manufacturing such a sill (10).

17 Claims, 8 Drawing Sheets

(56) References Cited

U.S. PATENT DOCUMENTS

Figure 1:
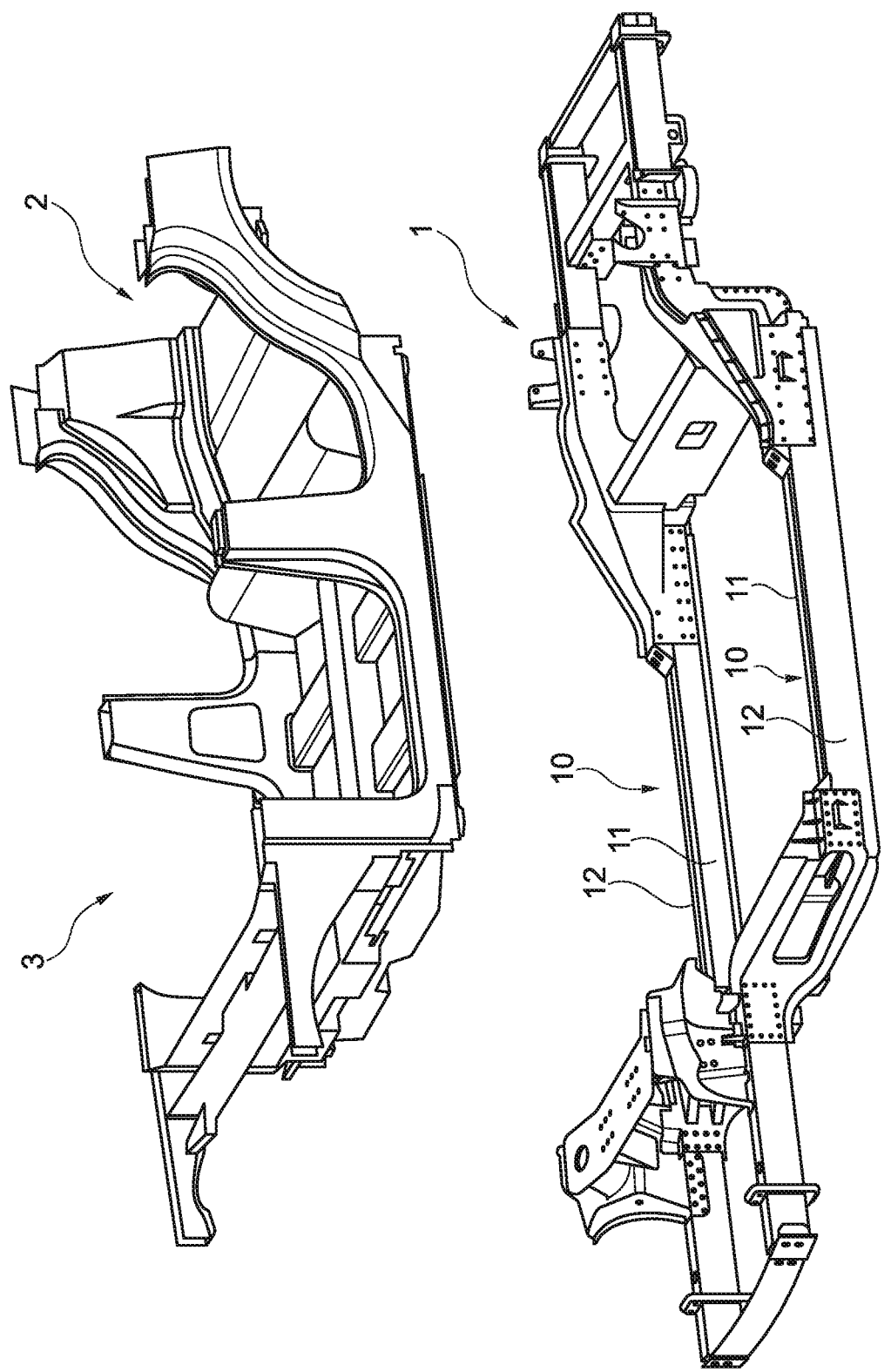

| | | | | |
|---|---|---|---|---|
| 2013/0270863 A1* | 10/2013 | Young | .................. | B60R 16/04 |
| | | | | 296/187.12 |
| 2014/0327274 A1* | 11/2014 | Baldwin | ............... | B23K 11/20 |
| | | | | 296/209 |
| 2015/0145288 A1* | 5/2015 | Kellner | ............... | B62D 25/025 |
| | | | | 296/209 |
| 2016/0083017 A1* | 3/2016 | Sakaguchi | ........... | B62D 21/157 |
| | | | | 296/187.12 |
| 2016/0325786 A1* | 11/2016 | Elfwing | .............. | B62D 29/008 |
| 2017/0015361 A1* | 1/2017 | Koch | .................... | B62D 25/025 |
| 2017/0050675 A1* | 2/2017 | Kellner | ................ | B62D 21/15 |
| 2017/0305250 A1* | 10/2017 | Hara | ....................... | B60K 1/04 |
| 2017/0305251 A1* | 10/2017 | Hara | .................... | H01M 50/20 |
| 2018/0057062 A1* | 3/2018 | Keuthage | ............ | B62D 21/157 |
| 2018/0065677 A1* | 3/2018 | Tutzer | ................... | B62D 29/04 |
| 2018/0134318 A1* | 5/2018 | Hata | ..................... | B62D 27/065 |
| 2018/0237075 A1* | 8/2018 | Kawabe | .................. | B60K 1/04 |
| 2019/0031241 A1* | 1/2019 | Ayukawa | ............ | B62D 21/157 |
| 2019/0077462 A1* | 3/2019 | Yang | .................... | B62D 29/005 |
| 2019/0248423 A1* | 8/2019 | Kato | ...................... | B62D 25/025 |
| 2019/0276086 A1* | 9/2019 | Onishi | ................. | B62D 21/157 |
| 2019/0359048 A1* | 11/2019 | Tsuyuzaki | ............ | B62D 21/157 |
| 2019/0359265 A1* | 11/2019 | Tsuyuzaki | ................ | B60K 1/04 |
| 2020/0114972 A1* | 4/2020 | Lee | ...................... | B62D 25/025 |
| 2020/0269924 A1* | 8/2020 | Watanabe | ........... | B62D 29/008 |
| 2020/0377045 A1* | 12/2020 | Renegar | ................. | B60R 19/00 |
| 2020/0406982 A1* | 12/2020 | Chung | ................... | B62D 21/09 |
| 2021/0024138 A1* | 1/2021 | Kaiki | ..................... | B60J 5/042 |

\* cited by examiner

SILL AND VEHICLE FRAME OF A VEHICLE BODY AND METHOD OF MANUFACTURING A SILL

This invention concerns a sill of a vehicle body, a ladder frame of a vehicle body and a method of manufacturing a sill.

In a vehicle platform structure, the vehicle body consists of a vehicle frame and a vehicle superstructure. The vehicle superstructure, which can also be referred to as the vehicle cabin, is placed on the frame, which is also referred to as the vehicle frame or ladder frame. The vehicle frame has longitudinal beams which, in the area of the passenger compartment, are also referred to as sills or side sills and extend in the longitudinal direction of the vehicle. In addition, the vehicle frame has cross beams. In addition, seat cross beams can also be incorporated into the frame as part of the vehicle superstructure.

The vehicle frame and in particular the sill are for example made of a profile that can be made, for example, of aluminium.

In the event of a crash, in particular a side pole crash or pole impact, the sill must serve both for absorbing the impact energy and for reliably protecting the inner parts of the vehicle. Even in the event of a frontal collision, the reliability of the sill must be guaranteed. In order to meet such requirements, the profile of which the sill is made must have a complex shape which is difficult to manufacture.

The object of the present invention is therefore to provide a solution which provides reliable protection in the event of a crash and which is also easy to manufacture.

According to a first aspect, the problem is solved by a sill of a vehicle body. The sill is characterized in that the sill comprises at least a first sill profile and a second sill profile, in that the sill profiles extend in the longitudinal direction of the sill and each have a connecting surface which faces the other sill profile, in that the connecting surfaces extends at least partially vertically, in that the at least two sill profiles are, at least via a region of the connecting surfaces of the sill profiles, adhesively connected to one another, and in that on at least one of the sill profiles, adjacent to the connecting surface, at least one snap-in protrusion is formed onto it, which interlocks with at least one snap-in receiving section of another one of the sill profiles.

A sill is defined in particular as part of the substructure of a vehicle body, in particular a vehicle frame. The sill is in particular a part of a ladder frame of the vehicle body. In particular, the sill forms at least part of the longitudinal beam of the frame and is located in the lateral area of the passenger compartment. The part of the longitudinal beam that extends between the A and C pillars of the vehicle superstructure is particularly preferably referred to as sill. The sill can also be referred to as the side sill.

The sill shall comprise at least a first sill profile and a second sill profile. The first sill profile is also referred to as the inner sill profile, and the second sill profile is referred to as the outer sill profile. The sill may also have other sill profiles. For example, the first and/or the second sill profile can be made up of several parts.

The sill profiles are preferably closed hollow profiles.

The sill profiles extend in the longitudinal direction of the sill and each have a connecting surface facing the other sill profile. The connecting surfaces of the first and second sill profiles preferably correspond to each other at least with respect to shape and size. The connecting surface is an outer surface of the sill profile via which one sill profile is in contact with the connecting surface of the other sill profile when the sill is mounted. In particular, the sill profiles are in contact with one another through adhesive applied to the connecting surface(s). The connecting surfaces can also be referred to as contact surfaces or adhesive surfaces.

The connecting surfaces extend at least partially vertically. As a result, the sill has a vertically divided and, in particular, two-part shape. Preferably, the entire connecting surface lies in the vertical direction.

Directions such as vertical, horizontal, top and bottom, unless otherwise indicated, refer to the sill or vehicle frame in the mounted state of the vehicle. In the context of the invention, the horizontal direction is to be understood in such a way that it extends approximately parallel to the road surface, but may well be inclined by a few degrees thereto. In particular, horizontal means an inclination to the road surface of no more than 10 degrees. Accordingly, vertical also means that this direction is approximately perpendicular to the horizontal direction, but can again be inclined by a few degrees, in particular not more than 10 degrees.

According to the invention, the at least two sill profiles are adhesively connected via at least one region of the connecting surfaces of the sill profiles. For this purpose, adhesive is applied to at least one area of the connecting surface of one or both sill profiles. The thickness of the adhesive layer, for example, can be 0.5 mm. A cold-hardening adhesive, in particular a two-component structural adhesive, is preferably used as adhesive. Preferably, the adhesive layer covers the entire connecting surfaces of the sill profiles.

In addition, on at least one of the sill profiles, adjacent to the connecting surface, at least one snap-in protrusion is formed, which interlocks with at least one snap-in receiving section of the other of the sill profiles. The at least one snap-in protrusion can be located directly on the edge of the connecting surface or at a small distance from the connecting surface. According to the invention, it is also possible that several snap-in protrusions are provided on one sill profile. In this case, several snap-in receiving section are respectively provided on the other sill profile. In addition, it is also possible to provide at least one snap-in protrusion and at least one snap-in receiving section on one sill profile. In this case, also at least one snap-in protrusion and at least one snap-in receiving section are provided on the other sill profile. The snap-in receiving section or snap-in receiving sections are also adjacent to the connecting surface of the respective sill profile, i.e. they are located at the edge of the connecting surface or near the edge of the connecting surface.

The snap-in protrusion, which can also be referred to as the snap-in element, can in particular be a snap-in nose or a snap-in arm. The snap-in receiving section can be a recess or groove in which the snap-in protrusion can positively interlock.

The snap-in protrusion is formed onto the sill profile according to the invention. In particular, "formed onto" is understood as a snap-in protrusion which is formed in one piece with the sill profile, i.e. which is uniform in material with the sill profile. The snap-in protrusion thus forms an integral part of the sill profile. The snap-in protrusion preferably extends over the entire length of the sill profile. With this design, the snap-in protrusion can be easily formed during the manufacturing of the sill profile, for example by extrusion through a corresponding shape in the die.

In this invention, the sill consists of at least two adjacent sill profiles and these sill profiles are connected to each other both by adhesive connection and by snap-in connection, thus achieving a number of advantages.

By connecting the two sill profiles both by adhesive connection and by snap-in connection, the sill profiles can be held together and the sill can still be produced easily. If the sill profiles are connected after the adhesive has been applied to the connecting surface(s) via the snap-in connection, the snap-in connection ensures the correct alignment of the sill profiles to each other already during the hardening of the adhesive. In addition, the snap-in connection supports the adhesive connection even in the event of a crash. By the connection both by means of snap-in elements and by means of adhesive, the hold of the sill profiles onto each other can still be guaranteed even in the case of deformation of one of the sill profiles. In addition, the use of adhesive connection and snap-in connection is advantageous over a connection by means of separate fastening elements, such as screws or rivets, as the number of parts required to manufacture the sill is reduced. In addition, the manufacturing time is reduced, as the snap-in protrusion(s) can be interlocked simultaneously with the corresponding snap-in receiving sections and thus only one step is necessary to establish the snap-in connection.

According to a preferred embodiment, the strength of the second sill profile is lower than the strength of the first sill profile. The second sill profile, when the vehicle is mounted, is the outer sill profile, i.e. the sill profile facing outwardly, and the first sill profile is the inner sill profile, i.e. the sill profile facing the centre of the vehicle. The difference in strength can be set by the material and/or shape of the sill profiles.

In particular, due to the different strengths, on the one hand the second sill profile of lower strength can serve as a deformation zone in the event of a crash. The impact energy is converted into forming energy and thus absorbed in the outer sill profile. On the other hand, the first or inner sill profile can, due to its higher strength, prevent the sill from kinking or the sill from being penetrated by an object such as a pole.

By connecting the sill profiles by means of adhesive connection and snap-in connection, a reliable connection of the sill profiles can also be guaranteed in the event of a crash. This is particularly important for the preferred embodiment with sill profiles of different strength, as the second or outer sill profile in particular has a lower strength and is therefore deformed in the event of a crash.

According to a preferred embodiment, the first and second sill profiles are connected to each other by means of two snap-in connections. Instead of two snap-in connections or the arrangement of two snap-in protrusions on one of the sill profiles, only one snap-in protrusion and one fixed tongue-and-groove connection can be formed. For example, a hook-like, rigid protrusion can be provided on the second sill profile which interlocks with a groove formed on the first sill profile. When connecting the two sill profiles, the tongue-and-groove connection can first be established and then the snap-in connection can be established via the snap-in protrusion by rotating around a longitudinal connecting axis. The longitudinal connecting axis is the axis that runs through the groove of the tongue-and-groove connection and preferably extends in the longitudinal direction of the sill profiles.

According to an embodiment, the first and second sill profiles have different wall thicknesses from each other. The wall thickness of the first sill profile is preferably larger than the wall thickness of the second sill profile. Thus, even with the same material of the two sill profiles, a different strength of the sill profiles can be produced. According to an embodiment, the wall thickness of the thinnest wall of the first sill profile is at least three times as large as the wall thickness of the thinnest wall of the second sill profile.

Alternatively or additionally to different wall thicknesses, the sill profiles can also be made of different materials. The sill profiles are preferably made of aluminium alloys. The first sill profile can, for example, be made of a higher-strength aluminium alloy and the second sill profile of a soft aluminium alloy. Alternatively, identical aluminium alloys can be used, wherein the sill profiles are used in different heat treatment conditions or sill profiles subjected to different heat treatments are used. According to one embodiment, the first sill profile is made of a different material than the second sill profile and preferably the yield strength Rp0.2 of the material of the first sill profile is at least by 30 MPa, in particular at least 50 MPa, greater than the yield strength Rp0.2 of the second sill profile.

The second sill profile is thus soft to deformation, i.e. it is suitable for energy absorption and can reduce load peaks, while the first sill profile is resistant to bending.

According to an embodiment, at least the first sill profile has different wall thicknesses. By selecting different wall thicknesses, the strength of the first sill profile can be specifically adjusted in pre-set areas of the sill profile.

According one an embodiment, the bottom wall of the first sill profile has a greater wall thickness than the other walls of the first sill profile. The bottom wall is the wall that faces the ground in the mounted state of the vehicle. The bottom wall of the first sill profile can therefore also be referred to as the floor of the first sill profile.

By making the bottom wall of the first sill profile thicker, the stability of the first sill profile can be further increased. In addition, a greater wall thickness of the bottom wall enables a secure connection of vehicle components to the sill. In particular, a holder for other vehicle components can be attached to the bottom wall of the first sill profile.

Particularly preferably, a fastening rail for a battery holder of a vehicle battery is received in the first sill profile. The fastening rail can in particular be a screwing strip. For example, a battery box can be attached to the fastening rail in which the drive batteries of the vehicle can be inserted. An electric vehicle requires a large number of drive batteries, whereby the weight to be carried by the fastening rail is high. By mounting the fastening rail in the first sill profile, it rests on the bottom wall of the first sill profile. This means that the fastening rail can hold a large weight, as it cannot detach from the first sill profile even with a large weight. In the bottom wall of the first sill profile preferably one or more openings for the screws are provided. The fastening rail is preferably made of steel and can be a U-shaped profile, for example. By being made of steel, the fastening rail contributes to increasing the stiffness, in particular the bending stiffness, of the first sill profile. The U-shape of the fastening rail also further increases the stiffness of the first sill profile.

According to a preferred embodiment, the first and second sill profiles are multi-chamber profiles. In the case of a multi-chamber profile, the individual chambers inside the profile are separated from each other by partition walls. The strength of the first and second sill profiles can be specifically adjusted by the number, orientation and shape of the chambers and thus the partition walls. Thus, according to an embodiment of the first sill profile, the partition walls of the multi-chamber profile can, for example, be horizontal. This increases the bending stiffness in this direction and the sill can withstand a load in the horizontal direction particularly well in the event of a crash.

According to one embodiment, the second sill profile has round hollow chambers. A round hollow chamber is a chamber which is bounded by at least one partition wall which is curved. Because the partition walls have a curved shape, they can be reliably deformed, especially in the event of a side crash.

According to an embodiment, the connecting surface of the first sill profile is one entire side surface of the first sill profile. This means that the first sill profile is in contact with the second sill profile over an entire side surface of the first sill profile. This maximizes the size of the connecting surface and thus the size of the area via which the first sill profile can be adhesively connected to the second sill profile. The connecting surface of the first sill profile, which can also be referred to as the contact surface or adhesion surface, is preferably a flat surface. In the assembled state of the sill, this connecting surface is in contact with a preferably also flat connecting surface of the second sill profile. The side surface of the sill profile is the outer side of a side wall of the sill profile which, in the assembled state, faces the other sill profile. In the case of the embodiment in which the connecting surface is an entire side surface of the first sill profile, preferably on the top side and on the bottom side of the first sill profile, respectively, a snap-in receiving section is incorporated, into which snap-in protrusions of the second sill profile can interlock. If the second sill profile has a height corresponding to the height of the first sill profile, also the entire side surface of the second sill profile can preferably be the connecting surface. However, according to one embodiment, the first sill profile has a lower height than the second sill profile. In this case, when the sill is assembled, the second sill profile extends downwards over the first sill profile. This structure enables a vehicle component attached to the underside of the first sill profile, for example a holder for the vehicle's drive batteries, to be protected from the outside by the second sill profile. According to one embodiment, on at least one connecting surface of one of the sill profiles at least one protrusion is formed which extends in the direction of the connecting surface of the other sill profile and the free end of which rests against the connecting surface of the other sill profile. The protrusion can thus be referred to as spacer between the connecting surfaces. This protrusion can be used to adjust the width of the adhesion gap formed between the connecting surfaces of the two sill profiles. This prevents the adhesive from being squeezed out. The at least one projection preferably lies in the connecting surface. Several protrusions can be provided distributed over the connecting surface so that the width of the adhesion gap can be guaranteed over the entire connecting surface. The protrusion or protrusions may extend over the entire length of the sill profile. With this design, the protrusion can be formed as an extruded extension and can therefore be formed by extrusion during the manufacturing of the sill profile.

According to one embodiment a recess is formed in the upper side of the sill. The recess can be made in the first or second sill profile or can be formed by the first and second sill profiles together. By making a recess in the top of the sill, it is possible to improve the connection of the sill to the vehicle superstructure of the vehicle, which has to be applied to the vehicle frame and thus also to the sill. In particular, a positive locking may occur if a bulge corresponding to the recess is provided on the underside of the vehicle superstructure. The recess can contribute to increasing the stiffness of the sill and can have a positive effect in particular due to the undercut effect in case of a side crash. If the sill is adhesively connected to the vehicle superstructure of the vehicle, the recess also increases the available adhesion surface and thus further improves the hold between the sill and the vehicle superstructure. The recess can, for example, have a V-shaped, U-shaped or semi-circular cross-section or be a deeply grooved notch.

According to an embodiment, the recess lies in the area of the connecting surface. As lying in the area of the connecting surface here in particular a recess, which lies above the vertical connecting surface is understood. In particular, the lower end of the recess can be formed by a stem of a snap-in protrusion arranged above the vertical connecting surface of the first and second sill profiles and extending horizontally, for example. Thereby, the adhesion gap is closed at the top between the connecting surfaces of the two sill profiles. The recess is formed particularly preferably by bevels on the two sill profiles. In this embodiment, the recess has a V-shape. This embodiment is particularly advantageous, as the cross-section of the two sill profiles is easy to produce with a bevel. In addition, the recess can have a large depth without weakening the individual sill profiles. A large depth of the recess can improve the hold between the sill and the superstructure of the vehicle. This improvement is due on the one hand to the greater overlap between the sill and the superstructure and on the other hand to the larger contact area, which can be used to glue the superstructure to the sill or fasten it in another way.

Since the hold between the first and the second sill profile is given by both adhesion and snap-in connection, this is sufficient to prevent the sill profiles from being pushed apart by the weight of the vehicle superstructure inserted into the recess.

The embodiment, in which the recess for connection to the vehicle superstructure is formed by the two sill profiles together, is of particular advantage, as the adhesion gap between the first and second sill profiles can be covered by a snap-in protrusion towards the top. The snap-in protrusion can form the bottom of the recess.

Preferably the sill profiles are aluminium profiles. The sill profiles are particularly preferred extrusion profiles. Extrusion profiles are referred to as extruded profiles. The cross-sections and formed-on shapes of the individual sill profiles required for the construction of the sill according to the invention can be easily produced by extrusion.

According to a further aspect, the invention relates to a vehicle frame of a vehicle body, which comprises two sills according to the invention, which extend in the longitudinal direction of the vehicle frame. The vehicle frame is characterized in that the first sill profile of the respective sill faces the center of the vehicle frame and the second sill profile of the respective sill faces outwards.

According to another aspect, the invention concerns a method of manufacturing a sill of a vehicle body. The sill produced in this way is a sill according to the invention with the structure described above. The method is characterized in that adhesive is applied to a connecting surface of at least one sill profile, the sill profile is connected to the other sill profile via a snap-in connection and the snap-in connection is maintained at least until the adhesive has hardened.

Advantages and features described with regard to the sill according to the invention also apply—if applicable—correspondingly to the vehicle frame according to the invention and the method according to the invention and vice versa.

In the method according to the invention, the snap-in connection serves as a pre-fixating of the two sill parts to each other, before the adhesive connection, in particular the hardening of the adhesive, provides further fixation.

The adhesive is preferably applied to the entire connecting surface of one of the sill profiles. However, it is also part of the invention to keep at least the edge of the connecting surface free of adhesive when applying the adhesive in order to prevent the adhesive from leaking. After the sill has been assembled, however, the adhesive is preferably present over the entire connecting surface. The adhesive can be applied to the connecting surface of one of the two sill profiles. However, it is also part of the invention that the adhesive is applied to the connecting surfaces of the two sill profiles.

The invention will be explained again below with reference to the enclosed drawings.

Figure 2:
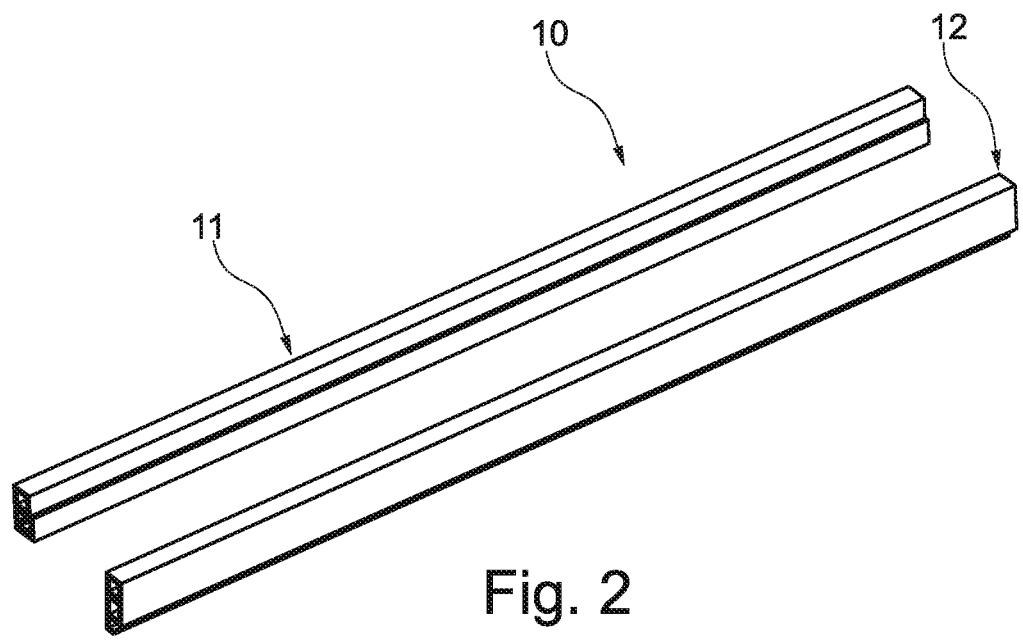
Figure 3:
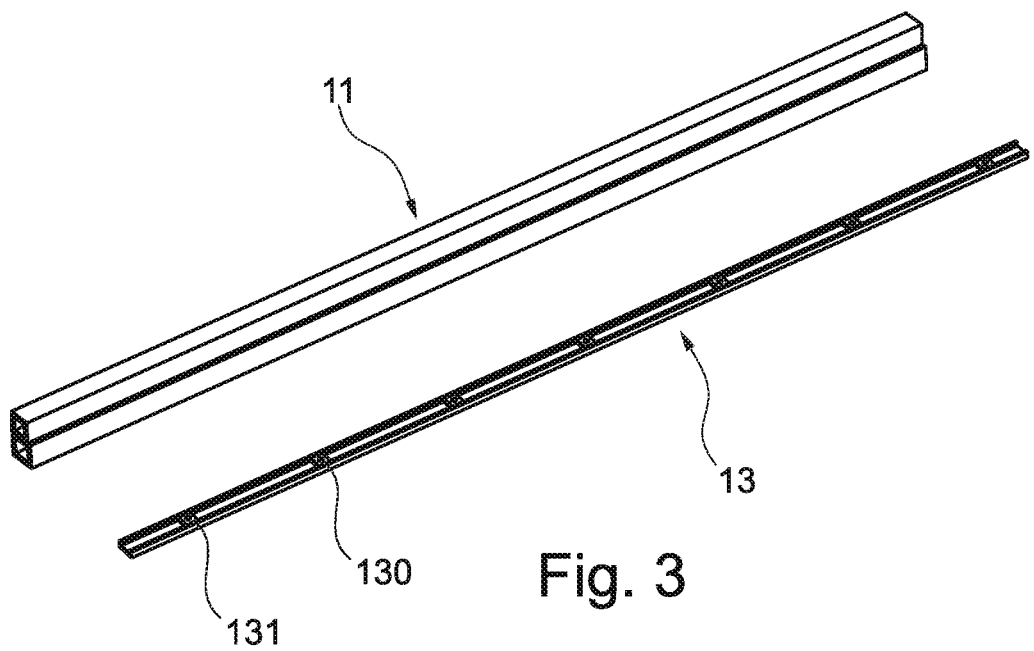
Figure 4A:
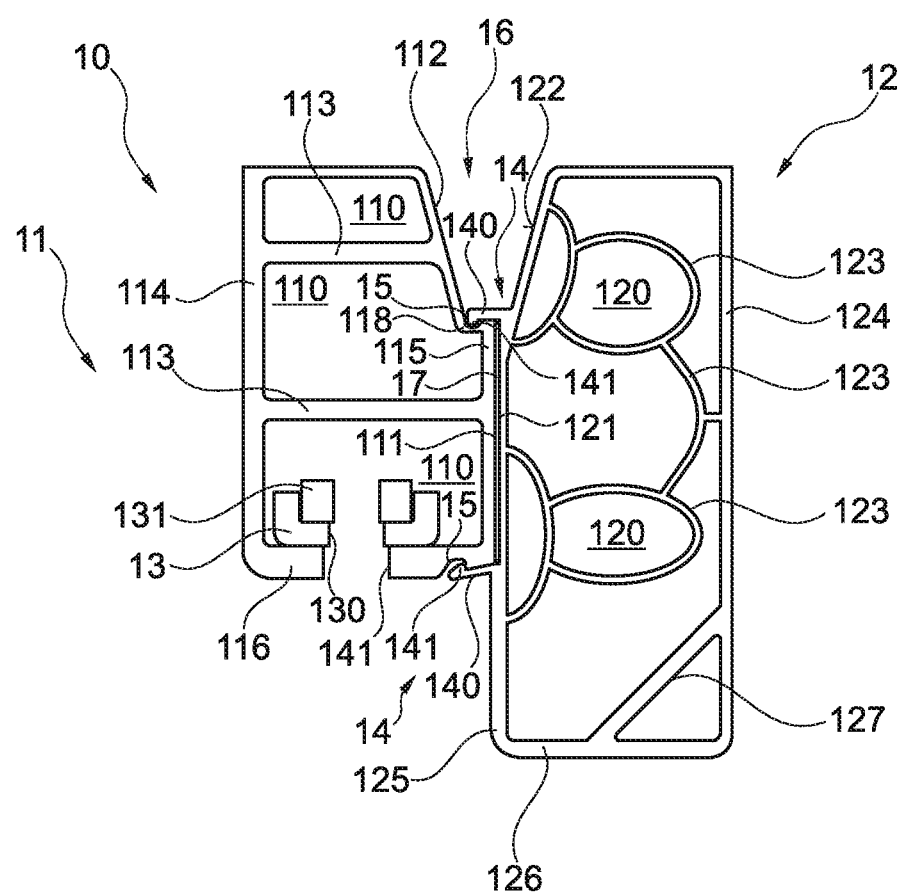
Figure 4B:
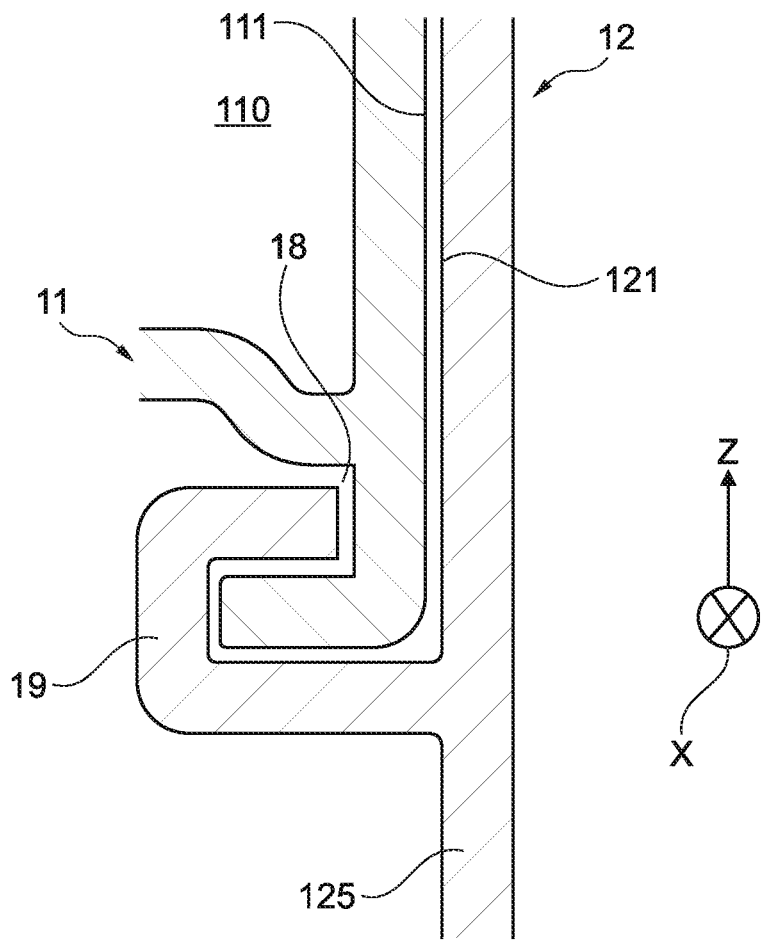
Figure 5:
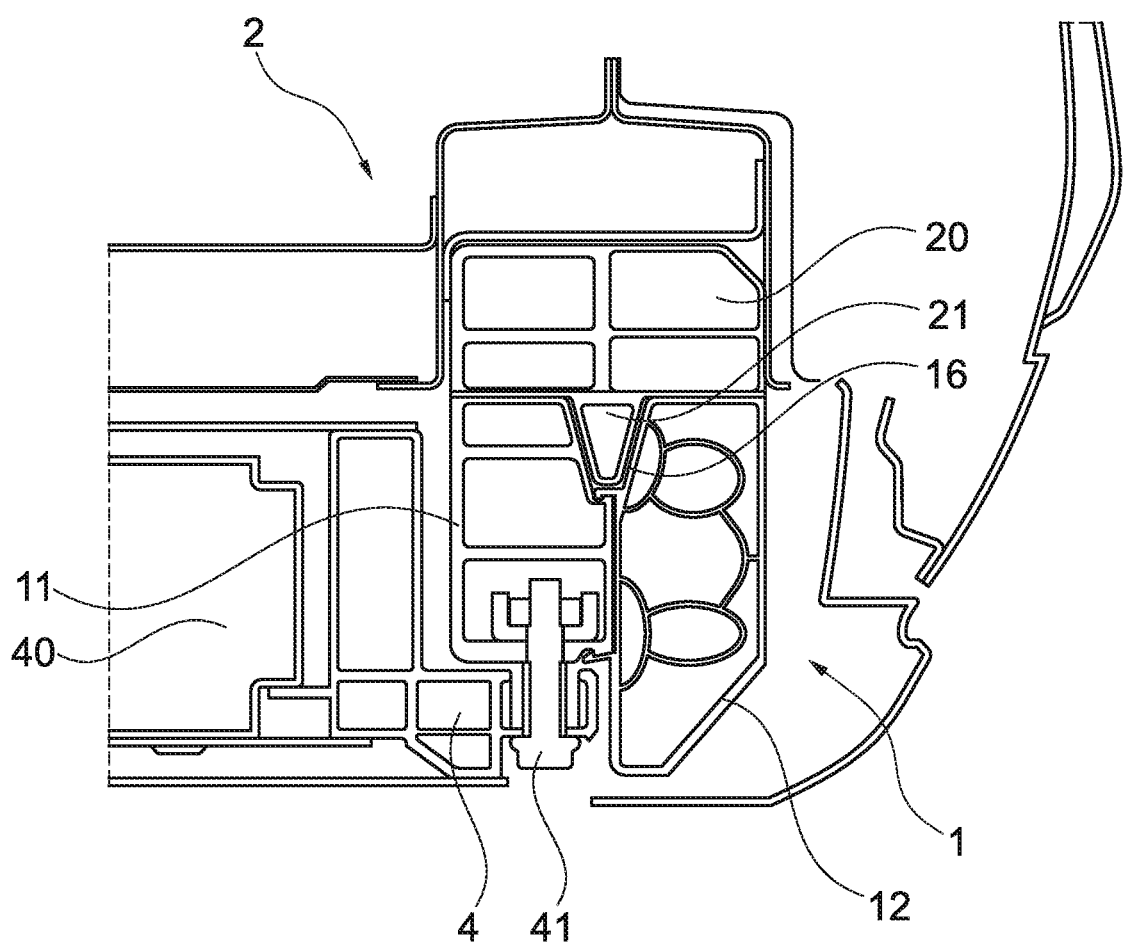
Figure 6:
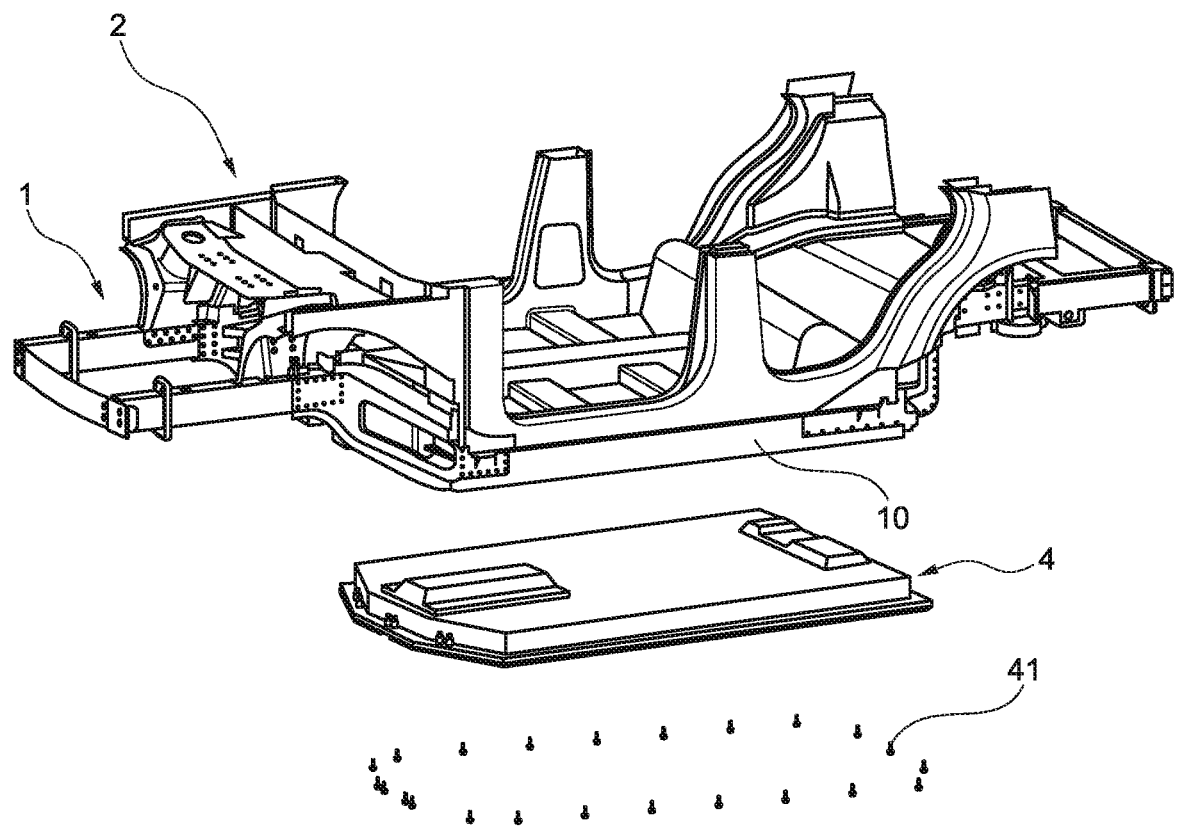
Figure 7:
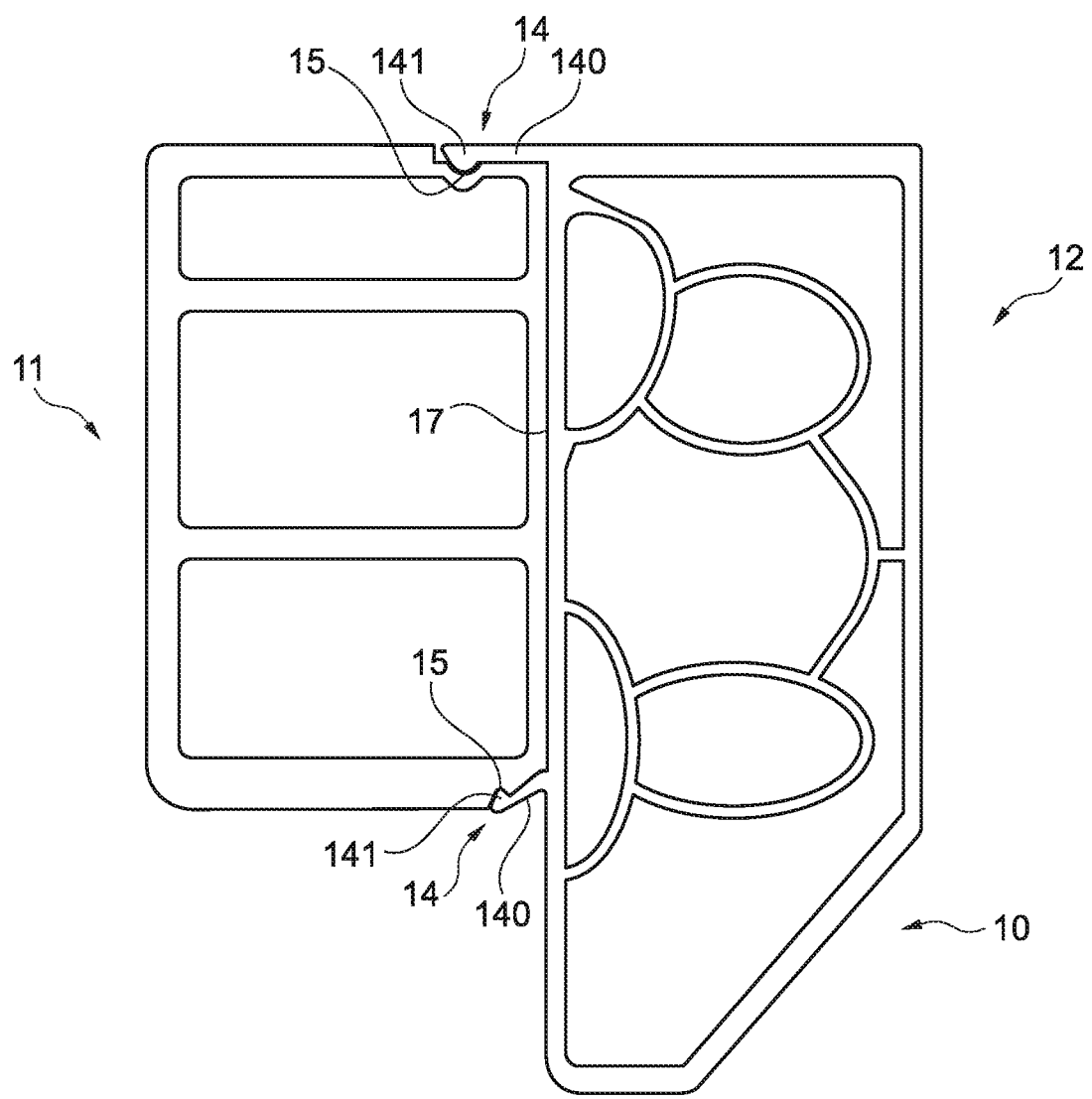
Figure 8:
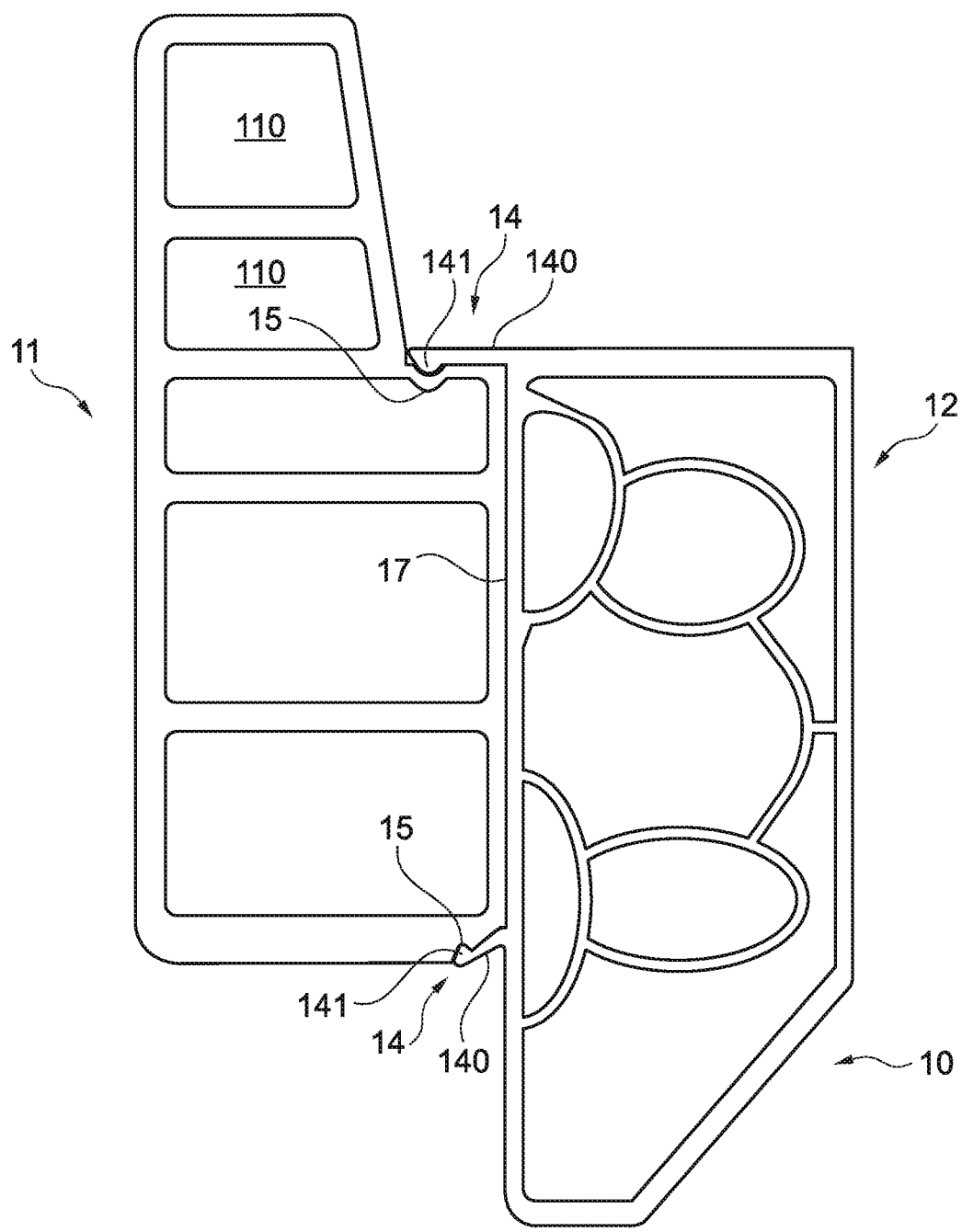

FIG. 1: shows a schematic exploded view of a part of a vehicle body with a vehicle frame according to the invention;

FIG. 2: shows a schematic exploded view of an embodiment of the sill according to the invention;

FIG. 3: shows a schematic exploded view of a first sill profile with fastening rail;

FIG. 4*a*: shows a schematic cross-sectional view of an embodiment of the sill according to the invention;

FIG. 4*b*: shows a schematic cross-sectional view of an alternative embodiment of the connection of the sill profiles according to FIG. 4*a*;

FIG. 5: shows a schematic cross-sectional view of an embodiment of the sill according to the invention in the assembled state of an embodiment of the vehicle body;

FIG. 6: shows a schematic exploded view of the embodiment of the vehicle body according to FIG. 1 with battery holder;

FIG. 7: shows a schematic cross-sectional view of another version of the sill according to the invention; and FIG. 8: shows a schematic cross-sectional view of another embodiment of the sill according to the invention.

FIG. 1 shows an embodiment of a part of a vehicle body 3 with the vehicle frame 1 according to the invention. The vehicle body 3 comprises a vehicle frame 1 and a vehicle superstructure 2. The vehicle superstructure 2 comprises in particular the floor panel with inserted seat cross beams, the columns of the body, in particular the A, B and C columns (incompletely shown). The vehicle frame 1 comprises two sills 10 which extend in the longitudinal direction of the vehicle frame 1 and form the sides of the vehicle frame 1 in the middle area of the length of the vehicle frame 1. The sills 10 are connected at their front end and rear end, respectively, with further frame parts of the vehicle frame 1 for the front body and the rear body of the vehicle. In the depicted embodiment, the connection is a connection via nodes, which can be, for example, cast nodes.

FIG. 2 shows an exploded view of the sill 10. Sill 10 consists of a first sill profile 11 and a second sill profile 12. The first sill profile 11 has a smaller width and height than the second sill profile 12. The length of the two sill profiles 11, 12 is almost equal. The sill profiles 11, 12 are preferably aluminium profiles, which are preferably produced by extrusion and can therefore also be called extrusion profiles.

FIG. 3 shows the first sill profile 11 as well as the fastening rail 13 which, in the assembled state, is inserted into this sill profile 11. The fastening rail 13 has a length corresponding to the length of the first sill profile 11. The fastening rail 13 is formed by a U-profile, preferably made of steel. Screw holes 130 are provided over the length of the fastening rail 13. In the depicted embodiment, the screw holes 130 are reinforced by screw sleeves 131.

FIG. 4*a* shows a cross-sectional view of a sill 10 design. The first sill profile 11 is inseparably connected to the second sill profile 12. The first sill profile 11 is a multi-chamber profile. The partition walls 113 are horizontal in the first sill profile 11 and represent flat walls. In the depicted embodiment, the first sill profile 11 has two partition walls 113 and thus three profile chambers 110, which are arranged one above the other. In the lower profile chamber 110 of the first sill profile 11 the fastening rail 13 is installed. The fastening rail 13 rests on the bottom wall 116 of the first sill profile 11. In the bottom wall 116, which can also be referred to as the floor, there is a passage opening 117 for the passage of a screw (not shown). The passage opening 117 is aligned with the screw hole 130 and the screw sleeve 131 of the fastening rail 13. The bottom wall 116 of the first sill profile 11 has a greater wall thickness than the other walls and the partition walls 113 of the first sill profile 11.

The side walls 114 and 115 of the first sill profile 11 have different heights in the shown embodiment. The side wall 114, which faces away from the second sill profile 12 and faces towards the centre of the vehicle frame 1 in the assembled state, has a greater height than the second side wall 115, which faces towards the second sill profile 12. These different heights are due to a bevel 112 of the first sill profile 11, which adjoins the upper end of the side wall 115 by an inwardly directed step 118 and is inclined to the first side wall 114.

The outer side of the second side wall 115, i.e. the side of the side wall 115 facing the second sill profile 12, forms the connecting surface 111 of the first sill profile 11 for the depicted embodiment.

In the step 118, which adjoins the upper end of the second side wall 115 and thus the connecting surface 111, a groove is provided in the upper side which extends in the longitudinal direction of the first sill profile 11. The groove is a snap-in receiving section 15 for the snap-in connection with the second sill profile 12. A further groove has been made in the underside of the bottom wall 116. This groove represents another snap-in receiving section 15 for the snap-in connection with the second sill profile 12.

The second sill profile 12 is also a multi-chamber profile. In the shown embodiment the second sill profile 12 is a round hollow profile. The partition walls 123 of the second sill profile 12 are designed as curved walls. Thus, mostly round profile chambers 120 are formed. In particular, the partition walls 123 represent partial ovals. In addition to the partition walls 123, in the shown embodiment a strut 127 is formed in the second sill profile 12. The strut 127 runs obliquely between the bottom wall 126 and the side wall 124 of the second sill profile 12 which faces away from the first sill profile 11.

The side walls 124 and 125 of the second sill profile 12 have different heights in the shown embodiment. The side wall 124, which faces away from the first sill profile 11 and in the assembled state is on the outside of the vehicle frame 1, has a greater height than the second side wall 125, which faces towards the first sill profile 11. These different heights are due to a bevel 122 of the second sill profile 12, which adjoins the upper end of the side wall 125 and is inclined towards the first side wall 124.

At the upper end of the second side wall 125 a first snap-in protrusion 14 is formed. This has a bar 140 which extends outwards from the side wall 125 in the direction of the first sill profile 11. On the underside of the snap-in protrusion 14, a snap-in nose 141 is provided at the free end of the stem 140. At a distance from the first snap-in protrusion 14, offset downwards, a further snap-in protrusion 14 is provided on the second side wall 125 of the second sill profile 12. The distance between the first snap-in protrusion 14 and the second snap-in protrusion 14 corresponds to the height of the side wall 115 of the first sill profile 11. The second snap-in protrusion 14 in the shown embodiment also has a bar 140 and a snap-in nose 141 at the free end of the stem 140. The snap-in nose 141 of the second snap-in protrusion 14 extends upwards from stem 140. The area of the outer side, i.e. the side facing the first sill profile 11, of the second side wall 125 of the second sill profile 12 between the upper and lower snap-in protrusion 14 forms the connecting surface 121 of the second sill profile 12.

The snap-in noses 141 of the snap-in protrusions 14 interlock with the grooves 15 of the first sill profile 11, which serve as snap-in receiving section. Thus, the first sill profile 11 and the second sill profile 12 are connected via a snap-in connection.

Additionally, there is adhesive (not shown) in the adhesion gap 17 formed between the connecting surfaces 111, 121. The connecting surfaces 111, 112 are thus in contact with each other via the adhesive. The adhesive is applied to one or both connecting surfaces 111, 121 before the sill profiles 11, 12 are placed against each other and fixated to each other via the snap-in protrusions 14 and snap-in receiving sections 15.

FIG. 4b shows an alternative embodiment of the connection between the two sill profiles 11, 12. In contrast to the embodiment of the connection according to FIG. 4a, the embodiment according to FIG. 4b has a hook-like, rigid protrusion 19 on the second sill profile 12 instead of a snap-in protrusion. The protrusion 19 interlocks with a groove 18 formed on the first sill profile 11. When connecting the two sill profiles 11, 12, the tongue-and-groove connection can now first be made by interlocking the protrusion 19 in the groove 18. Then, by rotating the second sill profile 12 about a longitudinal connecting axis X in the upper area, a snap-in connection can be created as shown in FIG. 4a by the upper snap-in nose 141.

FIG. 5 shows the sill 10 in its assembled state. The sill 10 essentially corresponds to the sill 10 shown in FIG. 4a. However, the underside of the second sill profile 12 of sill 10 according to FIG. 5 is bevelled. As a result, the bottom wall 126 of the second sill profile 12 has a smaller width and the first side wall 124 a smaller height than in the sill profile 12 of FIG. 4a. FIG. 5 shows that a battery holder 4 is attached to the first sill profile 11, which faces the center of vehicle frame 1. In particular, the battery holder 4 is screwed via screws 41 to the fastening rail 13 in the first sill profile 11. The battery holder 4 represents a multi-chamber profile in the shown embodiment. FIG. 5 schematically shows a drive battery 40 which is inserted into the battery holder 4. An embodiment of the battery holder 4 is shown in FIG. 7. In this embodiment, the battery holder 4 has a tray shape or bowl shape.

A vehicle superstructure 2 is mounted on the vehicle frame 1. FIG. 5 shows only a lower profile part of superstructure 2. The profile part can also be referred to as the upper sill 20. The upper sill 20 has on its underside a V-shaped bulge 21, which is a V-shaped profile chamber in the shown embodiment. The bulge 21 engages in the recess 16 of the sill 10 formed by the bevels 112, 122 of the first and second sill profiles 11, 12. The sill 10 can be connected to the upper sill 20 by screws, especially FDS screws (flow hole forming screws), rivets and/or by adhesives. When adhering, the adhesive surface is enlarged due to the recess 16 in the sill 10 compared to a sill 10 with a flat surface. Thus, the hold between the sill 10 and the upper sill 20 can be improved.

FIG. 7 shows another embodiment of the sill 10 according to the invention. This embodiment differs from the embodiment of the sill 10 shown in FIG. 4 by the shape of the sill profiles 11, 12 and their connection. In particular, the sill 10 has a flat top side in the embodiment shown in FIG. 7, i.e. there is no recess in the top side of the sill 10. The sill profiles 11, 12 are connected via an upper snap-in connection and a lower snap-in connection. The stem 140 of the snap-in protrusion 14 of the upper snap-in connection runs horizontally and the snap-in nose 141 is directed downwards. In the shown embodiment, the snap-in protrusion 14 is formed on the second sill profile 12. On the first sill profile 11 there is a corresponding snap-in receiving section 15 in the form of a groove in the upper side of the first sill profile 11. The snap-in mounting bracket 15 is located in a lowered step on the upper side of the first sill profile 11, which has a height corresponding to the thickness of the stem 140. Thus the top of the sill 10 forms a continuous plane after connecting the two sill profiles 11, 12. The lower snap-in connection corresponds to the lower snap-in connection of the embodiment according to FIG. 4a. In particular, the stem 140 of the lower snap-in protrusion 14 is tilted downwards and the snap-in nose 141 extends upwards from the stem 140. The lower snap-in protrusion 14 is designed like the upper snap-in protrusion 14 on the second sill profile 12 and interlocks with a snap-in receiving section 15 on the first sill profile 11. The lower snap-in receiving section 15 is formed at a bevel on the underside of the bottom wall 116. The bevel has an tilt which corresponds to the tilt of the lower snap-in protrusion 14, i.e. the bar 140 of the lower snap-in protrusion 14.

In the embodiment according to FIG. 7, the first sill profile 11 has a smaller height than the second sill profile 12. The cross-section of the first sill profile is rectangular. The second sill profile 12 has the cross-section shown in FIG. 5 and respectively described. The sill profiles 11, 12 are adhesively connected to each other by means of adhesive, which is present in the adhesive gap 17 between the connecting surfaces of the sill profiles 11, 12.

FIG. 8 shows a schematic cross-sectional view of another embodiment of sill 10. This embodiment differs from the embodiment according to FIG. 7 only in the shape of the first sill profile 11. In particular, the top of the rectangular first sill profile 11 according to FIG. 7 in the embodiment according to FIG. 8 adjoins further profile chambers 110. In the area of these additional profile chambers 110, the cross-section of the first sill profile 11 is wedge-shaped. In particular, a bevel 112 is provided adjacent to the step in which the snap-in receiving section 15 of the upper snap-in connection is inserted, which extends upwards at an angle to the first side wall 114. The first side wall 114 is vertical. The sill profiles 11, 12 are adhesively connected to each other by means of adhesive, which is present in the adhesion gap 17 between the connecting surfaces of the sill profiles 11, 12.

The present invention is not limited to the depicted embodiments. For example, the shape of the sill profiles may differ from the shape shown in the figures. For example, the number and shape of the profile chambers may differ from those shown. The external shape of the sill profiles can also deviate from the shape shown. In addition, the snap-in protrusions can also be provided at other points on the second sill profile or on the first sill profile. In this case, the snap-in receiving sections must also be positioned differently. It is only essential that one snap-in protrusion can be engaged with one snap-in receiving sections, thus enabling a snap-in connection between the sill profiles. The connecting surfaces are also not limited to the flat design shown in the figures. A connecting surface can be a curved surface or a surface with a step. It is only essential that the corresponding connecting surface on the further sill profile then has a corresponding shape and that an adhesion gap is thus formed between the connecting surfaces of the two sill profiles, which preferably has a constant width over the area of the connecting surface and divides the sill vertically at least in certain areas.

The present invention is of advantage over known vehicles in which the platform is made of aluminium and the sill is designed as a one-piece extrusion profile.

In particular, the present invention can be used to optimize crash behaviour in order to reduce the risk of intrusion into the battery box, especially in the case of an electric vehicle. In addition, a reduction in tolerances can be achieved by the manufacturing process of the aluminium profile in the sill.

In the invention, the sill is preferably separated vertically so that there is an inner and an outer sill profile. The inner sill profile is preferably made of a higher strength aluminium alloy and the outer sill profile of a softer aluminium alloy. In the connection process, the two sill profiles are inseparably connected to each other by snap-in connections and to each other by adhesive connections. Due to the different aluminium alloys, the outer sill profile, preferably made of a soft aluminium alloy, can be used as a deformation zone in a side crash. The inner sill profile, preferably made of a stronger aluminium alloy, hardly deforms and thus protects the battery box. A division into inside and outside with similar material thicknesses reduces the tolerances during the extrusion process.

An important aspect of the invention is the vertical division of the sill into two sill profiles, which are preferably adhesively connected to each other over the entire surface, and the profiles are additionally connected at least during the hardening process by means of snap-in elements which are made in one piece with and from the same material as the respective profile.

REFERENCE CHARACTER LIST 1 vehicle frame
10 sill
11 first sill profile
110 profile chamber
111 connecting surface
112 bevel
113 partition wall
114 side wall
115 side wall
116 bottom wall
117 passage opening
118 step
12 outer sill
1120 profile chamber
121 connecting surface
122 bevel
123 partition wall
124 side wall
125 side wall
126 bottom wall
127 strut
13 fastening rail
130 screw hole
131 screw sleeve
14 snap-in protrusion
140 stem
141 snap-in protrusion
15 snap-in receiving section
16 recess
17 adhesion gap
18 groove
19 rigid protrusion 2 vehicle superstructure
20 upper sill
21 bulge
3 vehicle body
4 battery holder
40 battery
41 screws
X longitudinal connecting axis

The invention claimed is:

1. A sill of a vehicle body, wherein the sill comprises at least a first sill profile and a second sill profile,
   wherein the at least first and second sill profiles extend in the longitudinal direction of the sill and each comprise a connecting surface which faces the other sill profile,
   wherein the connecting surfaces at least partially run vertically,
   wherein the at least first and second sill profiles over at least one area of the connecting surfaces of the sill profiles are adhesively connected to one another, and in that at least on one of the sill profiles, adjacent to the connecting surface, at least one snap-in protrusion is formed onto it which interlocks with at least one snap-in receiving section of another one of the sill profiles.

2. The sill according to claim 1, wherein the strength of the second sill profile is lower than the strength of the first sill profile.

3. The sill according to claim 1, wherein the wall thickness of the thinnest wall of the first sill profile is at least three times as large as the wall thickness of the thinnest wall of the second sill profile.

4. The sill according to claim 1, wherein the first sill profile consists of a different material than the second sill profile.

5. The sill according to claim 1, wherein the bottom wall of the first sill profile has a greater wall thickness than other walls of the first sill profile.

6. The sill according to claim 1, wherein a fastening rail for a battery holder of a vehicle battery is contained in the first sill profile.

7. The sill according to claim 1, wherein the at least first and second sill profiles represent multi-chamber profiles.

8. The sill according to claim 7, wherein the second sill profile has round hollow chambers.

9. The sill according to claim 1, wherein the connecting surface of the first sill profile is an entire side surface of the first sill profile.

10. The sill according to claim 1, wherein at least one connecting surface of one of the sill profiles at least one protrusion is formed which extends in the direction of the connecting surface of the other sill profile and the free end of which is in contact with the connecting surface of the other sill profile.

11. The sill according to claim 1, wherein the top side of the sill a recess is formed.

12. The sill according to claim 10, wherein the recess lies in the area of the connecting surface and is formed by bevels on the two sill profiles.

13. The sill according to claim 1, wherein the at least first and second sill profiles are aluminium profiles and preferably extrusion profiles.

14. A vehicle frame of a vehicle body comprising two sills according to claim 1, which extend in the longitudinal direction of the vehicle frame, wherein the first sill profile of the respective sill faces the center of the vehicle frame and the second sill profile of the respective sill faces outwardly.

15. The method for manufacturing a sill of a vehicle body according to claim 1, wherein a connecting surface of at least one sill profile adhesive is applied, the sill profile is connected to the other sill profile via a snap-in connection and the snap-in connection is maintained at least until the adhesive has hardened.

16. The sill according to claim 4, wherein the yield strength Rp0.2 of the material of the first sill profile is at least by 30 MPa greater than the yield strength Rp0.2 of the second sill profile.

17. The sill according to claim 16, wherein the yield strength Rp0.2 of the material of the first sill profile is at least by 50 MPa greater than the yield strength Rp0.2 of the second sill profile.

* * * * *